March 24, 1964     O. K. NILSSEN     3,126,540
CONTINUOUS WAVE RADAR SYSTEM

Filed June 25, 1958                            2 Sheets-Sheet 1

O. K. NILSSEN
INVENTOR.

BY
ATTORNEYS

United States Patent Office 3,126,540
Patented Mar. 24, 1964

3,126,540
CONTINUOUS WAVE RADAR SYSTEM
Ole K. Nilssen, Inkster, Mich., assignor to Ford Motor Company, Dearborn, Mich., a corporation of Delaware
Filed June 25, 1958, Ser. No. 744,382
6 Claims. (Cl. 343—9)

This invention relates to a continuous wave radar system and more particularly to a system wherein the character of a high frequency output wave is periodically varied over defined limits and a received reflected signal is compared thereto to provide range and range rate information.

This invention has as its principal object the provision of a single radar system capable of measuring a wide gamut of ranges utilizing narrow band width amplifiers.

A further object is the elimination of the effects of coupling or direct leakage between a transmitter and a receiver in a continuous wave radar system.

Another object is the provision of a continuous wave radar system which utilizes a single transmitting and receiving antenna.

Another object is the provision of a radar system wherein the range of a wave reflecting object is determined by the magnitude of a periodic signal and the range rate of change is determined by the frequency of this signal.

An advantage of this system is that it is not affected by the presence of the signal component received directly from the transmitter.

Another advantage of my invention is that it provides range information with tuned amplifiers having relatively narrow band widths.

Continuous wave radar systems of the prior art fall generally into two classes: those that measure a beat frequency between a frequency modulated transmitted signal and the same signal as reflected from a target as an indication of the time displacement between the two signals; and those that compare the phase of the modulation on the reflected signal with that of the modulation now being applied to the transmitted signal.

The former system, in order to provide reasonably accurate range indications at short ranges, must employ a relatively wide frequency sweep of the transmitted signal, so that sufficient beats may be counted between it and the signal currently received. This requires burdensomely wide band widths to obtain the required information.

The latter system requires rather effective isolation between the transmitting antenna and the receiving antenna, either by physical separation, or a phase shifting network to balance out the direct component, or both, so that the reflected signal alone may be examined, and the phase angle of its modulation compared to the phase of the modulating signal.

An advantage of my invention lies in the utilization of the direct transmitted voltage component and the determination of the time delay by the comparison of the timing of the amplitude or relative phase modulation of the resultant or the vector sum of the received component and the direct component, with the timing of the original modulation signal.

These and other objects and advantages of my invention will be apparent from the following description, in which.

Figure 1:
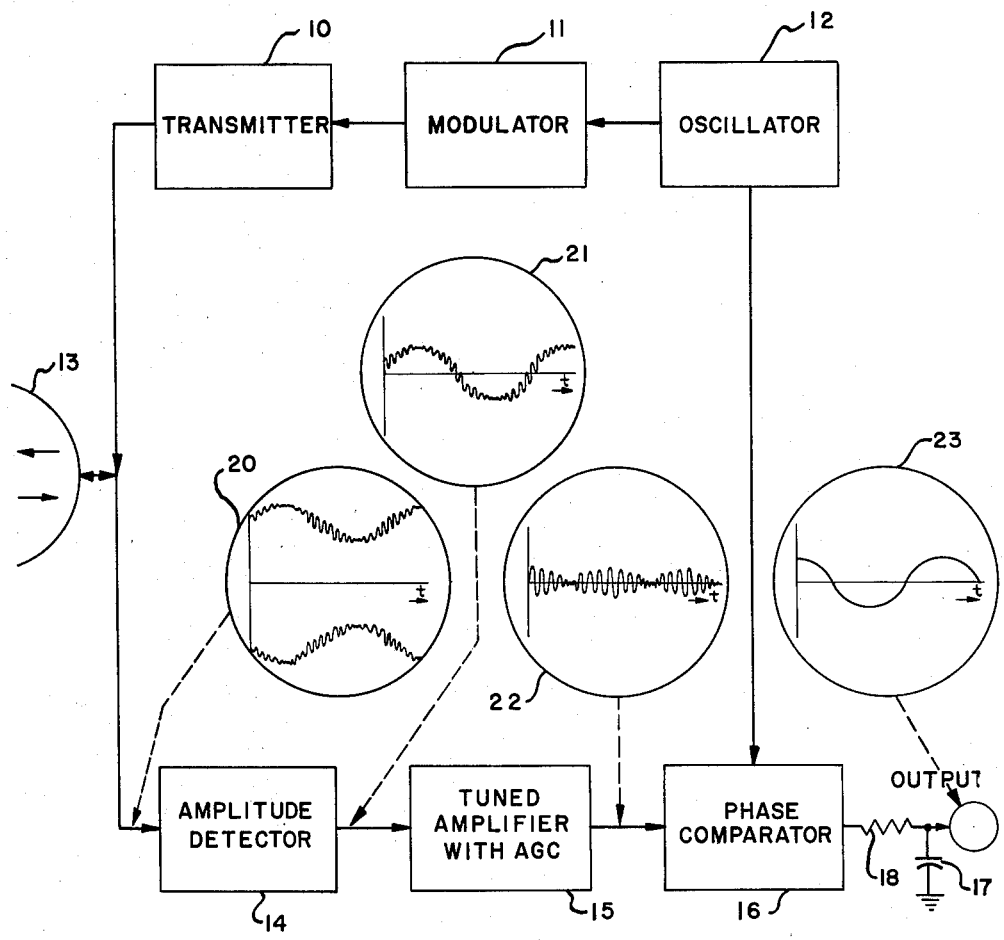
FIG. 1 is a block diagram of my invention.
Figure 2:
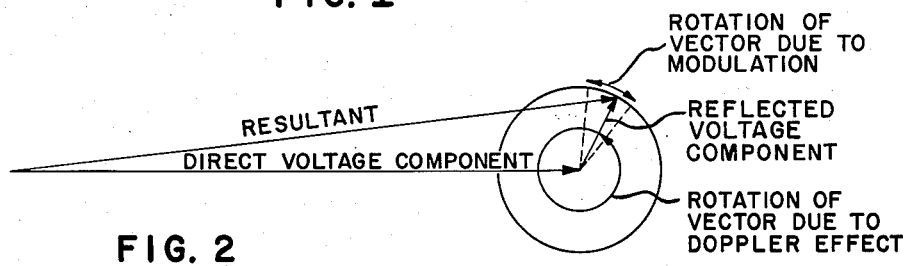
FIG. 2 is a voltage vector diagram of the relationship between the transmitted and the received voltages; and, FIG. 3 is a block diagram showing a more detailed radar system made in accordance with the teachings of my invention.

My invention can best be understood with reference to the vector diagram of FIG. 2 taken with FIG. 1. In FIG. 1 is seen a high frequency transmitter 10 connected to antenna 13 for directive radiation of a high frequency wave to a target, not shown. The transmitter is modulated by modulator 11, which in turn, is controlled by local oscillator 12. This modulation may take any convenient form, and for the purposes of the illustration in FIG. 2, I have employed sinusoidal phase modulation. The frequency of the local oscillator 12 should have a wave length at least twice as long as the greatest distance to be measured by the system. The reflected signal received by antenna 13 is there mixed or added with the transmitted signal and the resultant applied to amplitude detector 14.

The relationship of the direct transmitted signal and the received reflected signal may be understood with reference to FIG. 2. The direct voltage component is that which is received directly from the transmitter, and is taken as the reference against which the other vectors are compared. Added to this direct voltage component is the reflected voltage component, which is much smaller than the direct component and which may momentarily have any phase angle with respect to the direct component. For the purposes of the illustration, a random phase angle is assumed as illustrated. The resultant of the direct and the reflected components is shown as the vector sum of these components and may vary in phase and in magnitude with respect to the direct component which I have used as the reference. This resultant is, of course, the only voltage that is "seen" by the receiving portion of my system.

As mentioned above, systems common to the prior art have made phase comparisons for range measurement by attempting to isolate the reflected component, and measure the phase relationship of its modulation to the phase of the carrier modulating source. To accomplish this, separate receiving and transmitting antennae were employed, and physically separated as far from each other as practicable. In addition, since some direct leakage was inevitable between the antennae, a portion of the transmitted signal was fed through a phase inverter to effect 180° phase shift, and applied to the receiving portion in an effect to cancel the direct leakage component. The amount of such cancellation was usually limited.

I do not attempt to isolate or measure the reflected voltage component directly, either as to its magnitude or phase angle. Instead, I measure its effect on the resultant. Therefore, it will be helpful to the understanding of my invention to explore the dynamic characteristics of the vector diagram shown in FIG. 2. The reflected voltage component will rotate counterclockwise with respect to the direct component as the range between the transmitter and the target decreases, and the reflected vector will make one complete revolution of each wave length by which the total signal path (two x range) is shortened. This rotation is the well-known Doppler effect and the rate of rotation is equivalent to the Doppler frequency. Also, the phase modulation of the transmitted carrier will cause the phase angle of the reflected voltage component to enscribe an arc in synchrony with such modulation which is always present, regardless whether the relative distance between the transmitter and the target is changing or steady. If the phase or frequency of the transmitted wave were fixed, the phase relationship of the received wave would be fixed relative thereto, given a fixed range. However, the phase of the transmitted wave is constantly being modulated within limits and this will show up on the vector diagram as relative rotation between the direct component and the reflected component. It is axiomatic that when the reflected vector is substantially normal to the resultant vector, the amplitude variation of the resultant, due to this phase modulation, will be at a maximum, and the change in phase between the resultant and the direct vector will be at a minimum. Further, when the reflected vector is substantially in phase with the direct vector, or 180° out of phase therewith, the amplitude variation of the resultant due to the phase modulation will be at a minimum, and the phase variation will be at a maximum.

Assuming a given range so that no Doppler rotation of the reflected vector is present, the magnitude of oscillation of the phase angle between the reflected vector and the direct vector or direct voltage component is dependent upon and is a measure of range. The greater the range, the greater in amplitude will be the oscillation, due to the phase modulation, of the reflected vector as compared to the direct vector, and, of course, the length of the reflected vector will decrease. Also, the length of the reflected vector will change with changes in effective tangent area. However, the timing of the arcuate movement of the reflected vector will not be affected by its amplitude, and it is this timing that I employ to generate or otherwise cause a wave form which is then phase compared to the wave form of the local modulating oscillator to provide range information.

The timing of the reflected vector may be measured by either detecting the timing of the variations in the amplitude envelope of the resultant or the timing of the variations in phase thereof as compared to phase of the direct component. The embodiment shown in FIG. 1 measures the amplitude variation in amplitude detector 14, although a phase comparator may here be employed and is so employed in the embodiment of FIG. 3, the only difference being that the output wave form is shifted through 90°.

I preferably employ a common transmitting and receiving antenna 13. The vector summation of the direct signal and the indirect or reflected signal occurs at the antenna and produces the resultant shown in FIG. 2 which is applied to the amplitude detector 14.

The resulting amplitude modulation on the input wave form, that is, the vector summation of the direct and reflected signal, is shown at 20. The envelope of the wave form is shown. The high frequency amplitude variation of the envelope corresponds to the amplitude modulation of the resultant caused by the phase modulation. The frequency of the amplitude modulation of the resultant corresponds to the modulation frequency that is determined by the local oscillator. This can best be understood by reference to FIG. 2 and by reference to columns 2 and 3 in which the reason for the amplitude modulation of the resultant is explained in detail. The relatively slow amplitude variation shown is the Doppler frequency caused by continuous rotation of the reflected vector at the range rate in one-half wave lengths per second. The carrier is rejected in amplitude detector, but the amplitude variation of the envelope remains and is seen at 21.

This output is then applied to the input of amplifier 15. Amplifier 15 is tuned to the frequency of the local oscillator 12 which, therefore, rejects the Doppler frequency. Amplifier 15 is preferably provided with automatic gain control having a relatively long time constant, say 0.1 second, to be long compared to the change in signal strength caused by the Doppler effect, to stabilize the output of the amplifier. This output is represented at 22.

The output of amplifier 15 is applied to phase comparator 16 which may conveniently take the form of a synchronous detector that compares the phase of the input voltage with the phase of the local oscillator 12. The output of comparator 16, after low pass filtering by capacitor 17 and resistor 18, is a wave form, the amplitude of which is a measure of range and the frequency of which is a measure of range rate. It will be seen that the wave form of the output resembles the Doppler wave form with a frequency equal to the Doppler frequency.

With further reference to FIG. 2, it is seen that a phase reversal of the modulation takes place during half-waves of the Doppler wave due to the fact that, during the rotation of the reflected voltage vector, this vector is first in phase, then out-of-phase with the direct signal component. Therefore, the superimposed ampliude variation at the reference oscillator frequency, shown at 20 in FIG. 1, passes through a 180° phase shift with each half-wave at the Doppler frequency. The averaged output of the phase comparator 16 is first positive, then negative, for each half-wave of the Doppler frequency. Therefore, although the Doppler wave itself is rejected by a tuned amplifier 15, its effect is contained in the amplitude modulation of the output signal.

Figure 3:
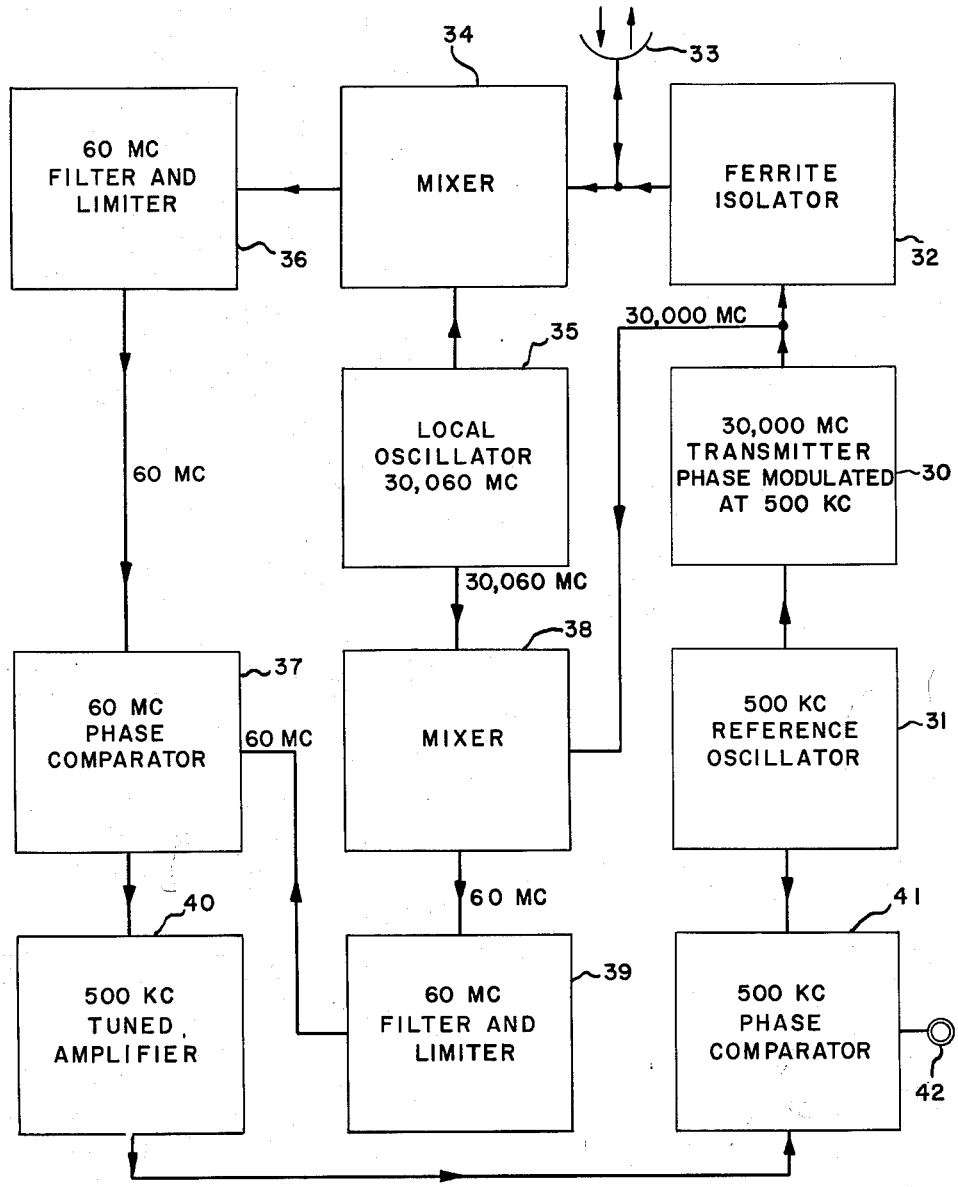

In FIG. 3 I have shown a radar system in accordance with my invention wherein I have assigned typical operating values for the purpose of illustration. It is to be understood that the values which I here use for illustration are intended in no way as a limitation on the scope of my invention, but only as representative values which are practical for use therein.

It is desirable to employ microwave radiating frequencies where the size of the radiating antenna and wave guide components are to be held small consistent with portability. Accordingly, in this example, I employ a carrier frequency of 30,000 megacyclese, providing a wave length of one centimeter. I further employ a heterodyne receiver, as it is desirable to limit the received signal, and a signal which has been heterodyned to a lower frequency is simpler to limit. Also, this embodiment serves to clearly illustrate my system of dual phase comparison wherein a heterodyned direct component is used as a reference in a first phase comparator, and the local or reference oscillator is used as the reference in a second phase comparator.

With reference to FIG. 3, a transmitter 30 is phase modulated by reference oscillator 31, and the modulated carrier is applied to antenna 33 through ferrite isolator 32. The purpose of the isolator is to provide a low impedance path from the transmitter to the antenna, and a high impedance path from the antenna to the transmitter. However, an ordinary attenuator may be used in lieu of a ferrite isolator.

The direct component and the reflected component are combined at the antenna and the sum thereof is applied to mixer 34 where it is heterodyned with a fixed frequency from local oscillator 35. Filter 36 is tuned to the difference frequency where the resultant is amplitude limited. Mixer 34, local oscillator 35, and filter and limiter 36 together comprise a microwave receiver. The output of this receiver is a 60 mc. signal which has the voltage and phase characteristics of the original mixed signal from antenna 33.

This signal is now applied to a first phase comparator where it is compared in phase with the direct component from the transmitter. To accomplish this, a portion of the transmitted signal is fed to second mixer 38. Mixer 38 also receives a signal from the local oscillator 35, and heterodynes this with the transmitted signal, and the difference is taken at filter and limiter 39. The phase of the output voltage of mixer 38 now corresponds to that of the direct component of FIG. 2, and its phase is compared with the phase of the resultant component at phase comparator 37. The output thereof is a signal having a wave form similar to that shown at 21 in FIG. 1.

I now have a signal voltage, the timing of the high frequency component of which is in synchrony with the timing of the phase changes of the resultant component as compared to the direct component and caused by the relative phase variation of the reflected component. The high frequency component of this signal voltage corresponds to the frequency of reference oscillator 31. However, any Doppler frequency, due to relative motion, is present, and I remove this by passing the signal through amplifier 40 which is tuned to the frequency of the reference oscillator. As in FIG. 1, the output of this amplifier is applied to a phase comparator 41 where it is compared in phase to a signal taken from the reference oscillator 31.

The difference in phase thus detected is proportional to the time of transmission of the signal, and, therefore, an indication of range to the reflecting object. Also, although the Doppler frequency itself is removed by tuned amplifier 40, the 500 kc. component will have amplitude envelopes in synchrony with the Doppler frequency, and these envelopes, as shown at 22 in FIG. 1, will cause corresponding average outputs from the phase comparator, the frequency of which is an indication of range rate.

It will be understood that the invention is not to be limited to the exact construction shown and described but that various changes and modifications may be made without departing from the spirit and scope of the invention. One such modification is the use of combination modulation to provide greater versatility and accuracy in the selection of the operating ranges. For instance, a combination of 2 mc., 200 kc. and 20 kc. modulation may be employed where the range involved is greater than the wave length of said selected frequency to provide thereby greater range capabilities and increased accuracy.

A further modification consists of varying the amount of phase modulation with range by increasing the modulation with decreasing range to provide thereby consistent accuracy over the entire range. To this end a feedback circuit may be employed which utilizes the R.M.S. radar output voltage to control the amount of modulation.

Also, accuracy and stability of the system may be enhanced by gating the signal received by phase comparator 16 in FIG. 1 or 41 in FIG. 3 to admit only a few cycles of the signal at its peak amplitude where the phase thereof may most readily and accurately be compared to the phase of the modulating oscillator signal.

What is claimed is:

1. A radar system for measuring range and range rate between the system and a target comprising a transmitting means, modulating means connected to said transmitting means for modulating said transmitting means with a modulating signal at a repetition rate substantially higher than the maximum Doppler frequency expected to be received, first means connected to said transmitting means for receiving and combining a signal transmitted by said transmitting means and a signal reflected from the target, second means connected to said first means for producing a signal containing a component due to the modulation and a Doppler component, third means connected to said second means for rejecting the Doppler component and for passing the component due to the modulation, and fourth means connected to said third means and to said modulating means for producing a signal having an amplitude which is a measure of range and a frequency which is a measure of range rate.

2. A radar system for measuring range and range rate between the system and a target comprising a transmitting means, modulating means connected to said transmitting means for modulating said transmitting means with a modulating signal at a repetition rate substantially higher than the maximum Doppler frequency expected to be received, means connected to said transmitting means for receiving and vectorially adding a signal transmitted by said transmitting means and a signal reflected from the target, detecting means connected to said last mentioned means for producing a signal containing a component due to the modulation and a Doppler component, frequency sensitive means connected to said detecting means for rejecting the Doppler component and for passing the component due to the modulation, and a phase comparator connected to said last mentioned means and to said modulating means for comparing the phase of the signal at the output of said last mentioned means with the phase of said modulating signal, the output of said phase comparator having a signal component the amplitude of which is a measure of range and the frequency of which is a measure of range rate.

3. A radar system for measuring range and range rate between the system and a target comprising a transmitting means, modulating means connected to said transmitting means for angle modulating said transmitting means with a modulating signal at a repetition rate substantially higher than the maximum Doppler frequency expected to be received, means connected to said transmitting means for receiving and vectorially adding a signal transmitted by said transmitting means and a signal reflected from the target, an amplitude detector connected to said last mentioned means for producing a signal containing a component due to the angle modulation and a Doppler component, a tuned amplifier connected to said amplitude detector, said tuned amplifier being tuned to the frequency of the modulating signal for amplifying the component due to the angle modulation and for rejecting the Doppler component, and a phase comparator connected to said tuned amplifier and to said modulating means for comparing the phase of the signal at the output of said tuned amplifier with the phase of said modulating signal, a low pass filter connected to said phase comparator, whereby the output of said low pass filter is a signal having an amplitude which is a measure of range and a frequency which is a measure of range rate.

4. A radar system for measuring range and range rate between the system and a target comprising a transmitting means, modulating means connected to said transmitting means for modulating said transmitting means with a modulating signal at a repetition rate substantially higher than the maximum Doppler frequency expected to be received, first means connected to said transmitting means for receiving and vectorially adding a signal transmitted by said transmitting means and a signal reflected from the target, a phase comparator connected to said first means and to said transmitting means for producing a signal containing a component due to the modulation and a Doppler component, second means connected to said phase comparator for rejecting the Doppler component and for passing the component due to the modulation, and third means connected to said second means and to said modulating means for producing a signal having an amplitude which is a measure of range and a frequency which is a measure of range rate.

5. A radar system for measuring range and range rate between the system and a target comprising a transmitting means, modulating means connected to said transmitting means for modulating said transmitting means with a modulating signal at a repetition rate substantially higher than the maximum Doppler frequency expected to be received, first means connected to said transmitting means for receiving and combining a signal transmitted by said transmitting means and a signal reflected from the target, a phase comparator connected to said first means and to said transmitting means for producing a signal containing a component due to the modulation and a Doppler component, a tuned amplifier tuned to the frequency of the modulating signal means connected to said phase comparator for rejecting the Doppler component and for amplifying the component due to the modulation, and a second phase comparator connected to said tuned amplifier and to said modulating means for producing a signal having a component the amplitude of which is a measure of range and the frequency of which is a measure of range rate.

6. In a radar system for measuring range and range rate between the system and a target, a high frequency carrier generating means, an oscillator providing a signal having a wave length relatively long compared to the range of the target, said carrier generating means being connected to and phase modulated by said oscillator at a repetition rate substantially greater than the maximum Doppler frequency expected to be received, an antenna connected to said high frequency carrier generating means for transmitting said modulated carrier wave and for receiving a reflected signal from the target whereby the vector summation of said signal and said wave is made at said antenna to form a composite signal, a voltage limiter connected to said antenna to receive the composite signal from said antenna and to provide an amplitude limited output, a first phase comparator connected to receive the output from said limiter and to the output of said high frequency carrier generating means for providing a voltage output which represents the periodic phase deviation of said limited summation with respect to the phase of said modulated carrier wave and with a peak amplitude that is a direct function of the amount of said deviation, a tuned amplifier connected to the first phase comparator and tuned to the frequency of said oscillator for rejecting the Doppler component, a second phase comparator connected to said tuned amplifier and to said oscillator to compare the phase of the voltage output of said tuned amplifier with the phase of said oscillator signal whereby the output thereof is a periodic wave, the average amplitude of which is a direct function of the distance between the antenna and the obstacle and the frequency of which is proportional to the rate of change of said distance.

References Cited in the file of this patent

UNITED STATES PATENTS

| | | |
|---|---|---|
| 2,391,411 | Golbe et al. | Dec. 25, 1945 |
| 2,522,863 | Crosby | Sept. 19, 1950 |
| 2,641,754 | Clegg | June 9, 1953 |
| 2,714,206 | Blitz | July 26, 1955 |
| 2,755,463 | Richmond | July 17, 1956 |
| 2,825,056 | Rust | Feb. 28, 1958 |
| 2,958,862 | Rey | Nov. 1, 1960 |